United States Patent [19]

Shama et al.

[11] Patent Number: 4,956,198
[45] Date of Patent: Sep. 11, 1990

[54] ULTRAVIOLET-CURABLE CATIONIC VINYL ETHER POLYURETHANE COATING COMPOSITIONS

[75] Inventors: Sami A. Shama, Hoffman Estates; Erwin S. Poklacki, Arlington Heights; John M. Zimmerman, Hoffman Estates, all of Ill.

[73] Assignee: DeSoto, Inc., Des Plaines, Ill.

[21] Appl. No.: 243,794

[22] Filed: Sep. 13, 1988

[51] Int. Cl.$^5$ .............................................. B05D 3/06
[52] U.S. Cl. ..................................... 427/54.1; 522/42
[58] Field of Search ............... 427/54.1; 526/320, 301, 526/308; 522/42, 44, 47, 96, 68, 97; 528/49, 301, 302, 305, 307; 560/25, 84, 115

[56] References Cited

U.S. PATENT DOCUMENTS

| | | | |
|---|---|---|---|
| 4,751,273 | 6/1988 | Lapin et al. | 526/301 |
| 4,775,732 | 10/1988 | Lapin | 526/301 |
| 4,812,489 | 3/1989 | Watanabe et al. | 522/97 |
| 4,845,265 | 7/1989 | Lapin et al. | 526/320 |

*Primary Examiner*—Stanley Silverman
*Attorney, Agent, or Firm*—Dressler, Goldsmith, Shore, Sutker & Milnamow, Ltd.

[57] ABSTRACT

Substantially hydroxy free, liquid, ultraviolet-curable compositions comprise cationically polymerizable ethylenically unsaturated material including a vinyl ether-terminated polyurethane which is the reaction product of isocyanate-reactive material including a monohydric vinyl ether and a diisocyanate having the formula:

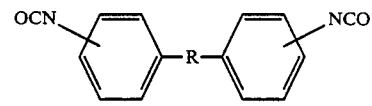

in which R is an alkylene group containing from 1–10 carbon atoms, this polyurethane having a number average molecular weight in the range of from 2000 to 6000, and a curing effective amount of a cationic photoinitiator which initiates a cationic cure when exposed to ultraviolet light, but less than 1% thereof based on the weight of the unsaturated material subjected to polymerization. These coatings are applied with a thickness of from 1 to 10 mils and cured with ultraviolet light, and they are particularly adapted to provide primary and single coatings for optical glass fiber.

3 Claims, No Drawings

ULTRAVIOLET-CURABLE CATIONIC VINYL ETHER POLYURETHANE COATING COMPOSITIONS

DESCRIPTION

1. Technical Field

This invention relates to cationically curable ultraviolet-initiated vinyl ether polyurethane coating compositions and includes new coating methods and coated optical glass fibers.

2. Background Art

Ultraviolet-curable coatings based on acrylate-terminated polyurethanes are well known. These cure in the presence of a free-radical polymerization catalyst initiated with ultraviolet light. Unfortunately, some acrylate materials are toxic and others are odorus. Moreover, and while these coatings cure relatively rapidly, for some purposes an even faster cure is desired. For these various reasons, it has been proposed to employ vinyl ether-terminated oligomers, especially polyurethane oligomers, since vinyl ethers are much less toxic and sweeter smelling than acrylates. However, although acrylates cure by free-radical polymerization, vinyl ethers do not hompolymerize to cure by that route, but rather cure by cationic polymerization.

Unfortunately, when typical vinyl ether-terminated oligomers are cured by a cationic polymerization, the products are relatively hard and brittle. Also, the cationic cure is not as fast as expected nor does it penetrate the thickness of the coating as well as expected based on our experience with the vinyl ethers themselves in comparison with the vinyl ether-terminated polyurethanes. In this invention, the cure is more rapid, it extends through much thicker layers, and the cured products are relatively soft and extensible.

Moreover, water resistance is an important attribute of a cured film, especially when that film is used to coat optical glass fiber which is an important feature of this invention. When typical vinyl ether-terminated oligomers are cured by a cationic polymerization, the products are quite senstive to water, and those provided herein possess improved resistance to water.

Also, the typical proportion of cationic photoinitiator which is suggested for cationic polymerization is in the range of 1% to 4%, usually 3% to 4%, by weight. It is found herein that a very rapid cure producing superior cured properties is obtained using smaller proportions of cationic photoinitiator.

Vinyl ether-terminated polyurethanes are described in Bishop, Pasternack and Cutler U.S. Pat. No. 4,472,019 and also in Lapin and House U.S. Pat. No. No. 4,751,273. In each of these prior disclosures the vinyl ether-terminated polyurethane is formed by the reaction of an aliphatic monohydric vinyl ether with a diisocyanate. In the Lapin and House disclosure all sorts of organic diisocyanates are disclosed, including those which are used herein. Indeed, the diphenylmethane diisocyanate preferably used herein is illustrated in some of the examples of that patent.

The Lapin and House disclosure also employs a 1:1 stoichiometry of hydroxy and isocyanate groups, albeit in some instances it is indicated to be desirable to use a slight excess of hydroxy vinyl ether to ensure the complete reaction of the isocyanate functionality. Accordingly, if the reaction is not pushed to cause it to be complete, or if excess hydroxy vinyl ether is employed, the polyurethane product will include small amounts of unreacted hydroxy functionality. This unreacted hydroxy functionality disturbs the cationic cure in this invention when the cationic photoinitiator concentration is very low, as is essential herein.

Lapin and House disclose the production of only one hydroxy vinyl ether, namely: triethylene glycol monovinyl ether. This product is stated to have been obtained with a purity of 95%, the remaining 5% being largely triethylene glycol divinyl ether. It is this mixture which is reacted with a stoichiometric proportion of either 2,4-toluene diisocyanate or diphenylmethane diisocyanate, the reaction being carried out by simply stirring the mixture including dibutyltin dilaurate catalyst for 5 hours without extraneous heat. As a result, the substantial elimination of hydroxy functionality is not assured.

Cure is disclosed using various radiation sources. When ultraviolet light is used for cure, the coating is merely indicated to be "thin" and to have cured to produce "a tack free glossy coating" when 4% of a triaryl sulfonium salt is used as the catalyst. As will be discussed, this invention must do far more than obtain a tack free glossy surface on a very thin film.

Lapin and House also disclose low molecular weight materials, the highest molecular weight illustrated being 1575 under circumstances where a much lower molecular weight would be calculated. Such low molecular weight materials produce cured films which are too hard and brittle for use in optical fiber coatings which are intended to contact the glass surface of the fiber.

Thus, and for many reasons, the Lapin and House disclosure does not provide ultraviolet-curable compositions of interest to the production of the relatively thick elastomeric coatings which are contemplated herein.

SUMMARY OF THE INVENTION

The present invention provides a substantially hydroxy free, liquid, ultraviolet-curable composition useful to provide relatively thick elastomeric coatings which comprises cationically polymerizable ethylenically unsaturated material including a vinyl ether-terminated polyurethane which is the reaction product of isocyanate-reactive material and a diisocyanate having the formula:

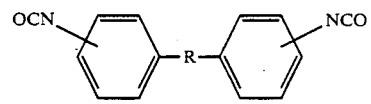

in which R is an alkylene group containing from 1 to 10 carbon atoms, preferably from 1 to 4 carbon atoms. These are illustrated by 1,2-diphenylethane diisocyanate and 1,3-diphenylpropane diisocyanate. It is preferred to employ compounds in which the two phenyl groups are carried by the same carbon atom so that the diisocyanate has the more specific formula:

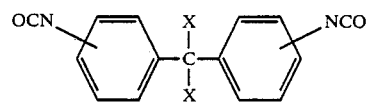

in which X is an alkyl group containing from 1-4 carbon atoms or hydrogen, and is preferably hydrogen.

These coating compositions are catalyzed with a cationic photoinitiator which provides a cationic cure when exposed to ultraviolet light, usually a sulfonium compound. The proportion of said photoinitiator is a curing effective amount less than 1% based on the weight of the unsaturated material subjected to polymerization. The preferred proportion of catalyst is from 0.1% to 0.8%, most preferably from 0.2–0.6%, on the same weight basis.

The subject coatings are especially adapted to provide coatings for optical glass fibers in which a more rapid cure and increased flexibility in comparison with those obtainable from typical vinyl ether-terminated polyurethanes is needed to enable such utility. Increased flexibility requires polyurethanes having a number average molecular weight in the range of from 2000 to 6000, and it is surprising to find that these respond well at low catalyst concentration. Primary coatings (sometimes termed buffer coatings) and single coatings for optical glass fiber as well as ribbon coatings to assemble coated optical fibers in a ribbon provide preferred aspects of this invention. Ultraviolet-curing coatings of general utility as well as stereolithographic baths and other known uses for ultraviolet-curing liquids are also contemplated.

DETAILED DESCRIPTION OF THE INVENTION

As previously indicated, the coating compositions of the present invention comprise a vinyl ether-terminated polyurethane based on the previously described aromatic diisocyanates and a curing effective amount less than 1% by weight, based on the ethylenic materials subjected to polymerization, of a cationic photoinitiator.

The vinyl ether-terminated polyurethane is the reaction product of an aliphatic monohydric vinyl ether and components forming an isocyanate-terminated oligomer which includes the previously described diisocyanate and a stoichiometric deficiency of material having a plurality of isocyanate-reactive hydrogen atoms, usually two.

The diisocyanates which are the basis of the isocyanate-terminated oligomers used to form the vinyl ether-terminated polyurethanes of this invention have previously been described by formula. The isocyanate groups are preferably in the para position, and 4,4′-diphenylmethane diisocyanate is particularly preferred.

Many diisocyanates are not very useful. Most of them produce vinyl ether-terminated polyurethane oligomers which either cure too slowly to be useful, or they do not cure at all. Using a typical aromatic diisocyanate, like toluene diisocyanate, to form an unsaturated polyurethane with the monovinyl ether of triethylene glycol, the product showed no discernable cure with 0.5% of the sulfonium cationic photoinitiator. The aliphatic diisocyanates, like isophorone diisocyanate, are more complicated. When these are made into polyurethanes of low molecular weight, then a reasonably rapid cure is obtained, but the water sensitivity is excessive. When higher molecular weight polyurethanes are made, then the cure is either too slow to be useful, or it does not proceed at all.

The materials having a plurality of isocyanate-reactive hydrogen atoms are usually polyols, but can be polyamines, and their use in stoichiometric deficiency forms isocyanate-terminated oligomers. The polyols are preferably diols, especially polyester diols, such as polycaprolactone glycol or poly(1,6-hexanediol carbonate) having molecular weights of from about 60–3,000, preferably from 300–2,000. Materials of higher functionality are illustrated by trimethylol propane and adducts thereof with caprolactone. Corresponding amine-terminated diamines, such as polyoxypropylene diamine, are also useful, forming polyureas on reaction with isocyanates instead of polyurethanes. The terminal hydroxy groups in the above polyols can be replaced by amine groups to form useful polyamines for reaction with the isocyanate functionality.

As will be evident, the closer the polyol and the diisocyanate are to a stoichiometric balance, the higher the molecular weight of the oligomer and the vinyl ether-capped product derived therefrom. Similarly, the higher the molecular weight of the polyol, the higher the molecular weight of the oligomer and the vinyl ether-capped product derived therefrom. These two factors as well as complete consumption of the hydroxy functionality combine to provide a hydroxy-free vinyl ether-terminated oligomer having a number average molecular weight in the range of 2000 to 6000, preferably in the range of 2500 to 4000. It is this relatively high molecular weight in combination with the low concentration of cationic photoinitiator which provides relatively thick elastomeric films which are cured throughout and which are clear and only pale colored (straw colored).

Polyurethanes and polyureas are specifically different, but both form similar isocyanate-terminated oligomers which can be used to form polyurethanes with the aliphatic monohydric capping agents in this invention. More particularly, the isocyanate-terminated oligomers are capped in this invention by reaction with a monohydric vinyl ether which can be a monovinyl ether or a polyvinyl ether.

In the above reaction, it is preferred to employ a stoichiometric balance between hydroxy and isocyanate functionality and to maintain the reactants at an elevated reaction temperature until the isocyanate functionality is substantially consumed which also indicates the hydroxy functionality is similarly consumed. It is also possible to use a small excess of isocyanate functionality, but it is still necessary to force the reaction to insure that the hydroxy content is less than 0.1% by weight for greater hydroxy concentration retards the rapid cure which is desired.

Thickness is important in this invention, the cured coatings having a thickness of from 1 to 10 mils, preferably from 2.5 to 6 mils. In the typical coating of optical glass fiber, the coatings applied to the glass have a thickness of about 3.0 mils, and they must be cured rapidly throughout that thickness to provide a clear and only slightly discolored coating having good physical properties including the capacity to resist considerable elongation without breaking and to resist water (both absorption and extraction).

It should be noted that capped polyurethanes can be made in many ways, as by forming an isocyanate-terminated oligomer followed by capping, by prereacting the capping agent with diisocyanate to form a monoisocyanate which is later reacted with polyol or polyamine, or by reacting all of the reactants together at the same time. All of these variations are acceptable and embraced by reference to the reaction product of an aliphatic monohydric vinyl ether, isocyanate-reactive polyol or polyamine, and sufficient organic polyisocyanate (preferably diisocyanate) to react with all of the isocyanate-reactive functionality.

The urethane and urea-forming reactions are well known, being easily carried out by heating to moderate temperature, e.g., about 40° C. to 80° C., preferably in the presence of an appropriate catalyst. The examples will adequately illustrate the urethane reaction, and reaction with amine to form urea can be carried out in the same way except that catalyst is not needed.

Aliphatic monohydric vinyl ethers have long been known, and can be formed in various ways, for example by reaction of a polyhydric alcohol, usually a diol, with acetylene in the presence of potassium hydroxide. Thus, any aliphatic diol, such as 1,4-butane diol, can be partially reacted to form the monovinyl ether, and this monovinyl ether can be separated by distillation and is available as such. Other monohydric vinyl ethers can be made in the same or other ways, it being preferred to employ those having a relatively low number average molecular weight below 1000, preferably below 500. These monohydric vinyl ethers can be used as an unsaturated capping agent for isocyanate-terminated oligomers to provide vinyl ether-terminated polyurethanes.

This invention will be illustrated using, as the vinyl ether, the monovinyl ether of 1,4-butane diol, but it will be understood that other aliphatic monohydric vinyl ethers can be substituted therefor. These other vinyl ethers will be illustrated by the monovinyl ether of 1,6-hexane diol, ethylene glycol, or triethylene glycol. Monohydric vinyl ethers based on polyols of higher functionality are illustrated by the divinyl ether of trimethylol propane or glycerin.

The cationic photoinitiators are themselves well known and available in commerce. They are typically illustrated by sulfonium compounds, but iodonium compounds are also known cationic photoinitiators, as are azo compounds. These compounds are used in the proportions which have already been discussed. A preferred, exemplary, catalyst is the triphenylsulfonium salt of hexafluoro phosphate which is available in commerce from General Electric Co. under the trade designation UVE 1016. The commercial photoinitiator is supplied as a 50% solution in propylene carbonate. The tiny amount of this volatile solvent introduced with the catalyst is too small to disturb the essentially solvent-free character of the compositions used herein. On the other hand, the catalysts used in the examples herein are only 50% active, which indicates that 50% of the catalyst used is constituted by propylene carbonate solvent.

The class of cationic photoinitiators is more fully discussed in U.S. Pat. No. 4,156,035 the disclosure of which is incorporated by reference. This patent indicated that any radiation sensitive aromatic onium salt of a group VIA element capable of releasing a Lewis acid when exposed to radiant energy can be used, triphenyl sulfonium fluroborate, triphenyl sulfonium hexafluorophosphate and triphenyl sulfonium hexafluoroantimonate being particularly illustrated. This patent used these onium salts in combination with what it describes as carbonyl type photoinitiators, i.e. the aldehyde and ketone carbonyl compounds having at least one aromatic nucleus attached directly to the carbonyl group. While such carbonyl type photoinitiators may also be present herein, it is presently preferred to use onium salts which are capable of functioning by themselves. Diaryliodonium salts, such as the 3M product sold under the trade name FC 509, are also contemplated, but these are normally used in combination with an aryl ketone photoinitiator, like benzophenone. The onium salts under consideration are also discussed in U.S. Pat. Nos. 4,069,055, 4,069,056 and 4,423,136.

Since iodonium salts normally require aryl ketones to also be present, it is preferred to employ triaryl sulfonium salts, such as the 3M product sold under the trade name FC 508 and the General Electric Co. products sold under the trade names UVE 1014 and UVE 1016. These sulfonium salts do not require aryl ketones to also be present.

The cationic cure is itself well known. Amines and carboxyl-functional compounds are known to be deleterious and hence there is no purpose in including them. It was not known that small amounts of hydroxy functionality would inhibit the cure of vinyl ether systems. It has now been found that the addition of 0.1% of hydroxy functionality by weight causes the cationic cure in this invention to be about 3 times slower than if that hydroxy functionality had not been added, and this will illustrate the importance of its absence.

The wet coatings of this invention when applied to the glass surface of an optical glass fiber usually have a thickness of from 2.5 to 6 mils, more usually about 3 mils. These relatively thick coatings must be cured rapidly which normally represents the application of ultraviolet light in a dosage in the range of about 0.1 to 1.0 J/sq cm. The coatings evaluated herein have a thickness of about 3 mils and are cured with an exposure of 1.0 J/sq cm.

It is desired to stress the significance of the proportion of cationic photoinitiator used in this invention. When one uses the conventional proportion of 3% to 4% of the cationic photoinitiator with the vinyl ether-terminated polyurethanes of this invention, extreme discoloration of the cured film is encountered, and the cure is inhibited in that it does not extend completely through the film. Using 0.5% sulfonium photoinitiator, as is here preferred, we get excellent cure speed, namely: a full cure extending completely through the film on an exposure of only 0.2 to 0.5 Joules/sq. cm. and the cured coatings are clear and of pale coloration, as previously indicated. Using acrylate-terminated polyurethane compositions it is found that most of these require far more than 0.5 Joules/sq. cm. using a free radical photoinitiator.

In addition, the low level of cationic photoinitiator reduces the level of hydrogen generation to around 2.0 microliters per gram. A typical prior art photoinitiator level of 3% causes extensive hydrogen generation of up to 39 microliters per gram which is manifestly excessive. Low levels of hydrogen generation are particularly important in the effective coating of optical glass fibers.

It is desired to amplify the significance of the selection of the described aromatic diisocyanates.

For the several reasons which have been discussed, the selection of the diisocyanate in combination with the reduced proportion of cationic photoinitiator leads to markedly improved and unexpected results.

While the vinyl ether-terminated polyurethanes and the cationic photoinitiators can be the only materials present, other ethylenically unsaturated materials can also be present, especially vinyl ethers, like isobutyl vinyl ether, octyl vinyl ether, or polyvinyl ethers illustrated by the divinyl ether of 1,4-butane diol, 1,4-cyclohexane diol, or 1,6-hexane diol. These materials are reactive diluents, and they modify the reactivity and viscosity of the liquid coating compositions as well as the hardness of the cured product. Further optional materials are illustrated in the Examples.

The vinyl ether-terminated polyurethanes desirably constitute from 30% to 90% of the mixture with the reactive diluent, preferably from 40% to 80%, that diluent constituting the balance of the ethylenically unsaturated material which is present. The preferred diluents are polyvinyl ethers of polyhydric compounds. These diluents lower viscosity while imparting only limited additional hardness to the composition, and in this respect differ from the experience had using polyacrylate diluents where increasing amounts of polyacrylates quickly increase the hardness and brittleness of the composition.

As previously stressed, the urethane-forming reaction is pushed to completion to consume substantially all of the hydroxy functionality which is present. The substantial absence of hydroxy functionality is here defined to constitute a hydroxy content of less than 0.1% of the weight of the composition. Also, hydroxy-functional vinyl ethers are substantially absent from the composition when vinyl ethers which are not polyurethanes are used as reactive diluents. Thus, hydroxybutyl vinyl ether cannot be used as a diluent in this invention because this would increase the hydroxy content of the composition above the stated limit. Even small amounts of hydroxy functionality in the composition to be cured inhibits the cure, so the fastest curing compositions are those which contain the least hydroxy functionality.

It is preferred to cure the coatings of this invention in an atmosphere having a relatively low relative humidity, e.g., less than about 45%. The preferred range is less than 30%, and is usually at least about 15% because lower relative humidities are difficult to provide. We prefer to operate at 25% relative humdity, and all the results obtained herein were obtained with the films being cured in an atmosphere having a relative humidity of 25%.

The invention is illustrated in the examples tabulated below in which all parts are by weight.

TABLE

| Component | 1 | 2 | 3 | 4 | 5 |
|---|---|---|---|---|---|
| U236 (Note 1) | — | — | — | 42.7 | — |
| U237 (Note 2) | 72.0 | 64.0 | 64.0 | — | — |
| U239 (Note 3) | — | — | — | — | 79.5 |
| TEGDVE | 27.5 | 25.5 | 25.5 | 36.0 | 10.0 |
| BDDVE | — | 10.0 | — | 20.8 | — |
| CHDDVE | — | — | — | — | 10.0 |
| UVE 1016 (50% active) | 0.5 | 0.5 | 0.5 | 0.5 | 0.5 |
| Viscosity, cps at room temp. | 1540 | 690 | 950 | 1750 | 6725 |
| Refractive Index | 1.488 | 1.481 | 1.485 | 1.471 | 1.497 |
| No tack dose (J/sq. cm) | | | | | |
| D lamp | 0.5 | 0.5 | 0.3 | 0.5 | 0.3 |
| H & D Lamps | 0.25 | 0.25 | 0.25 | 0.25 | 0.3 |
| Physical Properties (D Lamp, 1.0 J/sq. cm) | | | | | |
| Tensile, MPa | 12 | 16 | 16 | 16 | 20 |
| Elongation % | 38 | 25 | 22 | 34 | 58 |
| Modulus, MPa | 60 | 180 | 180 | 150 | 75 |
| $H_2$ Gen.,ul/g | 1.1 | 1.9 | 2.8 | 1.5 | 2.0 |
| Water Absorption* | 4.7% | 5.0% | 2.7% | 8.4% | 1.7% |
| Extractables* | 2.6% | 1.5% | 1.0% | 2.0% | 0.0% |

MPa identifies mega Pascals.
ul/g identifies microliters per gram.
*indicates the results of tests in which the free coatings are immersed in water at 25° C. for 24 hours.
The H & D lamps are similar in that each is 12 inches long and emits about 300 Watt per inch of length.
The D lamp emission contains a greater proportion of longer waves which better penetrate the film and is preferred for the cure of thicker films. More particularly, the D lamp emits 25.6 Watt/inch at 200 to 300 nanometers, 63.8 Watt/inch at 300-400 nanometers and 26.9 Watt/inch at 400-470 nanometers. The H lamp emits 44.8 Watt/inch at 200 to 300 nanometers, 31.0 Watt/inch at 300-400 nanometers and 17.7 Watt/inch at 400-470 nanometers.
Note 1: The U236 composition is made using apparatus consisting of a 500 ml 4-necked round bottom flask fitted with a stirrer, dry nitrogen sparge, 250 ml addition funnel, reflux condenser, thermometer, and a thermostatically controlled heating mantle. 22.82 parts of 4,4'-diphenylmethane diisocyanate were charged to the flask, and heated to 60° C. while stirring at 200 rpm. 7.02 parts of 4-hydroxybutyl vinyl ether were charged to the addition funnel and added over a 15 minute period. Cooling was necessary to maintain the temperature at 45° C. The reaction mixture was then held at 50° C. for an additional hour. The NCO content was then analyzed for informational purposes. 0.04 part of dibutyltin dilaurate catalyst was added to the reaction mixture. 70.13 parts of poly-1,6-hexane diol carbonate having a number average molecular weight of about 1200 (Duracarb 122 sold by PPG Industries Inc., Pittsburg PA can be used) were then added at one time to the flask. An exotherm carried the temperature to 80° C. which was maintained for an

TABLE-continued

| Component | 1 | 2 | 3 | 4 | 5 |
|---|---|---|---|---|---| additional three hours. At the end of this time, the NCO content was less than 0.1%. By calculation, the number average molecular weight was determined to be 3300.
Note 2: The apparatus used to make the U237 composition was the same as in Note 1.
20.91 parts of 4,4'-diphenylmethane diisocyanate were charged to the flask, and heated to 60° C. 22.74 parts of 1,4-butanediol divinyl ether were then added to the flask as a diluent and 7.45 parts of 4-hydroxybutyl vinyl ether were charged to the addition funnel and added over a 10 minute period. The reaction mixture was held at 60° C. for an additional two hours. The NCO content is then analyzed and the appropriate amount (to react with the unreacted isocyanate) of an adduct of caprolactone with diethylene glycol having a number average molecular weight of about 1,000 (Tone 220 supplied by Union Carbide Corporation, Chicago, IL can be used) were charged to the addition funnel. 0.06 part of dibutyltin dilaurate catalyst was then added to the flask and the addition funnel contents were added over a ten minute period while holding at 60° C. Thereafter the flask was heated to 70° C. and held at that temperature until the NCO content is less than 0.1%. By calculation, the number average molecular weight was determined to be 2400.
Note 3: The apparatus used to make the U239 composition was the same as in Note 1.
19.40 parts of 4,4'-diphenylmethane diisocyanate were charged to the flask and heated to 60° C. 19.96 parts of 1,4-butanediol divinyl ether diluent were then added to the flask and 5.36 parts of 4-hydroxybutyl vinyl ether were charged to the addition funnel and added over a 10 minute period. The reaction mixture was held at 60° C. for an additional three hours. The NCO content is then analyzed and the appropriate amount (to react with the unreacted isocyanate present) of an adduct of neopentyl glycol with e-caprolactone to provide a number average molecular weight of about 1,000 (Tone Polyol 2221 supplied by Union Carbide Corporation, Chicago, IL can be used) were charged to the addition funnel. 0.06 part of dibutyltin dilaurate were then added to the flask and the addition funnel contents were added over a 50 minute period while holding at 60° C. Thereafter the flask was heated to 70° C. and held at that temperature until the NCO content was less than 0.1% By calculation, the number average molecular weight was determined to be 3500.
TEGDVE identifies triethylene glycol divinyl ether.
BDDVE identifies 1,4-butane diol divinyl ether.
CHDDVE identifies 1,4-cyclohexane dimethanol divinyl ether.
The above three compounds are reactive diluents and these are normally needed to provide the liquidity needed for coating application, albeit one could use a volatile solvent or heat to provide that liquidity.
UVE 1016 is the cationic photoinitiator described previously.

The coating compositions tested in the above Table were formulated as follows.

The oligomer was heated to 60° C. to lower its viscosity, then the specified reactive diluents were added while mixing with a medium speed laboratory stirrer. Stirring was continued until a homogeneous solution was obtained, then the photoinitiator was added and mixing was continued until the photoinitiator dissolved completely.

These formulations were cured as follows.

A three mil drawdown was prepared on a glass plate and then exposed to ultraviolet radiation using a curing system equipped with one 12 inch D lamp, and a conveyor belt with variable speeds. The speed was adjusted to give the desired dosage measured in J/sq. cm. using an IL 390 light Bug radiometer from International Light Company.

The results obtained by testing the films stripped from the glass plate are reported in the Table. As will be seen, the cures reported are rapid, and the product characteristics are broadly appropriate for primary or single coatings on optical glass fiber since the cured coatings adhere to glass and are clear and straw-colored. They are also appropriate for use as a ribbon coating in which a plurality of coated optical glass fibers are held together in a ribbon.

To illustrate the coating of glass fiber, a freshly drawn optical glass fiber is drawn through any of the liquid coating compositions set forth in the Table and then through a die to apply a wet coating having a thickness of 3.0 mils. The wet coated fiber is then immediately exposed to ultraviolet light using a D lamp to supply 1.0 J/sq cm to cure the coating. The coated fiber can then be wound on a reel to provide a single-coated fiber, or it can be overcoated with a conventional secondary coating in conventional fashion to provide a dual coated fiber.

What is claimed is:

1. A method of coating a substrate comprising applying a film having a thickness of from 1 to 10 mils of a substantially hydroxy-free liquid, ultraviolet-curable composition comprising cationically polymerizable ethylenically unsaturated material including a vinyl ether terminated polyurethane which is the reaction product of a monohydric vinyl ether and an isocyanate-reactive polyol or polyamine selected from the group consisting of polycaprolactone glycol, poly(1,6-hexanediol carbonate), trimethylol propane and polyoxypropylene diamine and a diisocyanate having the formula:

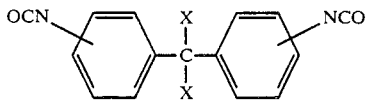

in which X is an alkyl group containing from 1-4 carbon atoms or hydrogen and a cationic photoinitiator, and exposing said film to ultraviolet light to cure the same.

2. A method as recited in claim 1 in which said film is exposed to said light in an atmosphere having a relative humdity less than about 45%.

3. A method as recited in claim 1 in which said polyurethane having a number average molecular weight in the range of from 2000 to 6000, and said film has a thickness of from 2.5 to 6 mils.

* * * * *